United States Patent [19]

Case et al.

[11] Patent Number: 4,863,119

[45] Date of Patent: Sep. 5, 1989

[54] PARACHUTE REEFING SYSTEM

[75] Inventors: Bruce E. Case; Phillip E. Kadlec, both of South St. Paul, Minn.

[73] Assignee: BRS, Inc., South St. Paul, Minn.

[21] Appl. No.: 243,076

[22] Filed: Sep. 9, 1988

[51] Int. Cl.[4] .................................. B64D 17/02
[52] U.S. Cl. ................................ 244/152; 244/149
[58] Field of Search ............... 244/142, 145, 147, 149, 244/151 B, 152

[56] References Cited

U.S. PATENT DOCUMENTS

| | | | |
|---|---|---|---|
| 1,771,261 | 7/1930 | Lendner | 244/142 |
| 2,399,379 | 4/1946 | Pence | 244/152 |
| 2,566,585 | 9/1951 | Smith | 244/152 |
| 2,754,074 | 7/1956 | Schade | 244/152 |
| 3,041,022 | 6/1962 | Sepp, Jr. | 244/152 |
| 4,664,342 | 5/1987 | Jones | 244/149 |
| 4,678,145 | 7/1987 | Buehrer et al. | 244/152 |

Primary Examiner—Joseph F. Peters, Jr.
Assistant Examiner—Rodney Corl
Attorney, Agent, or Firm—Dean P. Edmundson

[57] ABSTRACT

A reefing system comprising an annular flexible membrane having a centrally located vent opening and a plurality of guides symmetrically spaced around the periphery of the membrane. The reefing system retards or slows opening of the canopy of a parachute in order to reduce the shock normally encountered with parachutes.

14 Claims, 2 Drawing Sheets

PARACHUTE REEFING SYSTEM

FIELD OF THE INVENTION

This invention relates to parachute systems generally. More particularly, this invention relates to reefing systems or devices for slowing the opening of a parachute to reduce shock.

BACKGROUND OF THE INVENTION

Parachutes have long been used to lower personnel to the ground from an airplane. They have also been used to provide drag to slow the speed of vehicles, for example.

More recently parachutes have been used as a safety device on small aircraft such as hang gliders, ultralight aircraft, and the like. When equipment failure causes the craft to descend to the ground the parachute is deployed to slow the fall and protect the passenger and the craft from serious injury.

One problem which has been encountered with the use of parachutes is the sudden shock to the passenger or user when the canopy of the parachute opens and fills with air quickly. This is especially serious at high speeds. Of course, the shock is greater at high speed than at low speed, and the canopy fills more rapidly at high speed. Also, in more recent years parachutes are being made with low porosity or zero porosity fabric. The opening shock with such parachutes is even more severe than was the cause with parachutes made with porous fabric.

In order to alleviate the problem of opening shock there as been proposed the use of a "line cutter". This involves a line passing through small rings attached to the base of the canopy. The length of the line used determines the diameter of the parachute when reefed. A line cutter severs this line after a predetermined time delay, allowing the parachute to completely inflate. A line cutter has the disadvantage of being time sensitive. That is, it will reef for a predetermined amount of time regardless of airspeed. They are also difficult to pressure pack. As a result, this method for reefing has not been totally satisfactory.

Another previous method involved the use of a small canopy mounted inside the main canopy. A series of lines extend from the small internal canopy to the perimeter of the main canopy. At high speed the pressure on the small canopy tensions these lines and prevents the mouth of the main canopy from expanding. This method is very sensitive to tuning and manufacturing tolerances. As a result, it has not been commercially successful. It also involves much labor in production.

Another previous method was suggested which involved the use of a small square reefing device (approximately 14 inches square). The reefing device was a membrane having a ring at each of the four corners. All of the suspension lines of the parachute extended through these rings (i.e. one-fourth of the suspension lines pass through each ring). The membrane had a center opening. This device was apparently not successful.

There has not heretofore been provided a reefing system which is efficient, effective, and reliable in slowing the opening of a parachute canopy to reduce the shock.

SUMMARY OF THE PRESENT INVENTION

In accordance with the present invention there is provided a reefing system and method for slowing the opening of the canopy of a parachute to reduce shock. The reefing system is effective, efficient, and reliable.

In a preferred embodiment the reefing system comprises a flexible, generally planar membrane having an annular shape (i.e. ring shape). The periphery of the membrane includes a plurality of spaced-apart apertures (or rings) to serve as guides for the suspension lines. The apertures are evenly spaced around the periphery of the membrane.

There is one such aperture for each suspension line of the parachute. This arrangement assures symmetrical load distribution on the suspension lines.

The reefing device of this invention is larger than those previously suggested by several fold. The device forces the canopy skirt to open quickly to a relatively small diameter initially and then slowly allows the canopy opening to increase in diameter so as to prevent or avoid the shock normally encountered with filling of the canopy. The round or circular shape of the reefing device also forces the canopy of the parachute to take the proper round shape for filling with air.

The membrane of the reefing device is preferably a tough and durable material such as rip-stop nylon. The guides at the periphery of the device can be apertures in the membrane itself or they may be in the form of small rings which are attached to the periphery of the membrane. The diameter of the reefing device may vary, as desired.

Other advantages of the reefing system of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
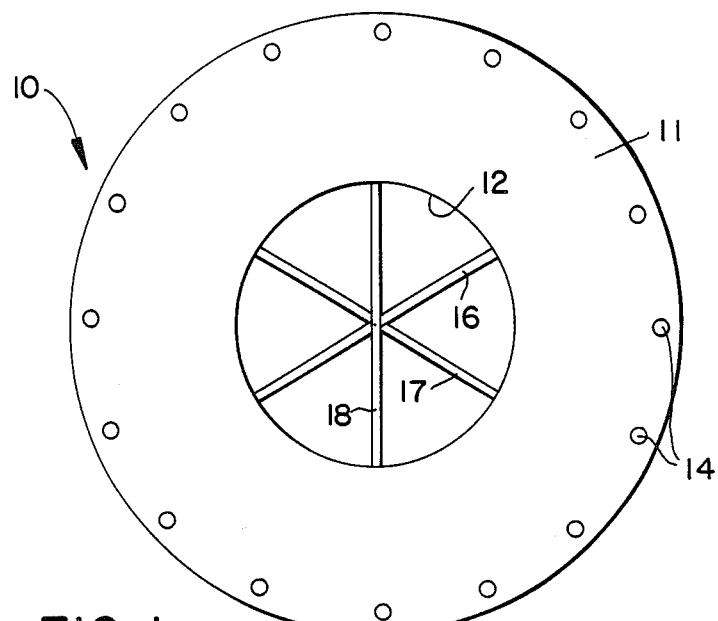
FIG. 1 is a top view of one embodiment of reefing device of the invention.

In the drawings there is illustrated a reefing device 10 of the invention comprising an annular shaped, essentially planar membrane body 11 having a circular central opening 12. Strips 16, 17 and 18 connect opposite sides of the body 11 across the central opening, as illustrated.

Apertures 14 are provided through body 11 near the periphery thereof. Preferably the apertures are equidistantly spaced around the periphery of body 11. A single parachute suspension line is adapted to pass through each aperture.

Figure 2:
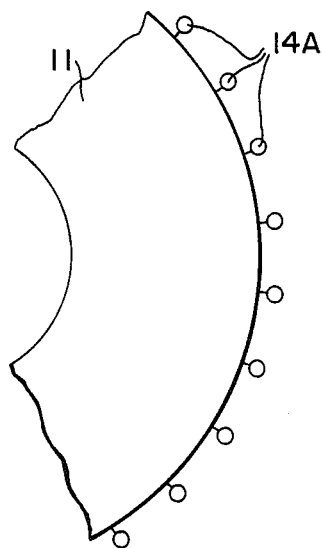
FIG. 2 is is a top fragmentary view of another embodiment of reefing device of the invention.

Preferably each aperture comprises a grommet. Alternatively, instead of apertures through body 11 there may be a plurality of ring members or guide members 14A secured to the periphery of the body 11, as illustrated in FIG. 2.

The body 11 comprises a flexible material having good tensile strength. Preferred materials include rip-stop nylon, Dacron, and canvas. The material is preferably reinforced at its inner and outer edges with a ring of fabric or nylon, for example.

Strips 16, 17, and 18 extend across the central opening and are attached at their opposite ends to body 11. These strips are composed of flexible, durable materials such as nylon, canvas, or the like. Preferably the strips are secured together at their mid-points where they overlap (e.g. they may be stitched or riveted together).

The reefing device 10 is adapted to be retained on the suspension lines of a parachute in a manner such that a single suspension line passes through a separate aperture 14 at the periphery of the body 11. When the parachute is packed the reefing device is folded such that it will not interfere with the unfolding of the parachute and the suspension lines when the parachute pack is opened.

If desired, the perimeter of reefing device may even be temporarily attached to the periphery of the parachute canopy (e.g. with rubber bands). When air pressure forces the canopy to open, the rubber bands will be urged off and the reefing device will beging sliding down the suspension lines.

The presence of the reinforcing strips 16, 17 and 18 help to keep the reefing device membrane flat (i.e. planar). They also add some rigidity to the membrane when acted upon by the air pressure. They also add resistance to air flow so that the reefing device is urged upwardly toward the canopy. This is desirable since it causes the canopy to open more slowly than if the strips were not present.

Figure 3:
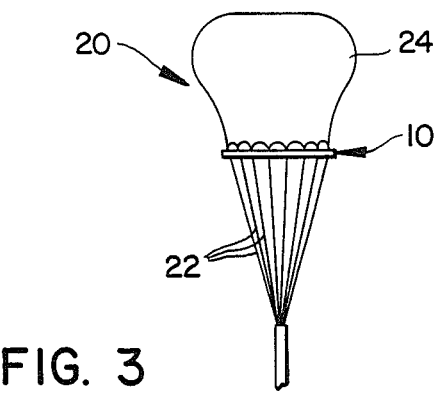
FIG. 3 is a side elevational view illustrating the position of the reefing device of FIG. 1 on the suspension lines of a parachute which has just been opened.

FIG. 3 illustrates the position of the reefing device 10 on the suspension lines 22 of parachute 20 when the parachute exits the pack and the canopy 24 begins to fill with air. As illustrated, the reefing device is initially positioned adjacent the open end of the canopy 24. The reefing device serves to retard the opening of the canopy of the parachute so as to prevent or avoid the shock associated with rapid filling of the canopy with air.

Figure 4:
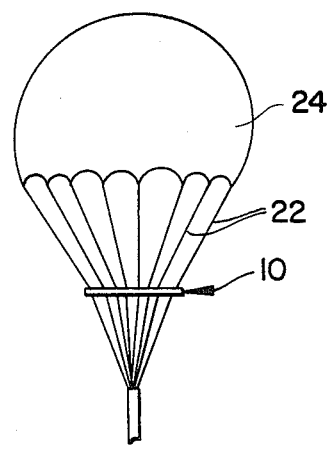
FIG. 4 is a side elevational view illustrating the position of the reefing device of FIG. 1 as the parachute continues filling with air.
Figure 5:
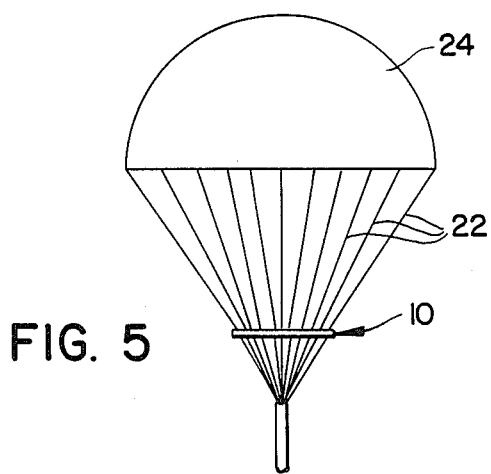
FIG. 5 is a side elevational view illustrating the position of the reefing device of FIG. 1 when the parachute is completely filled with air.

The reefing device 10 slowly slides down the suspension lines as the canopy fills with air. This is illustrated in FIGS. 4 and 5. In other words, as the canopy fills slowly with air the skirt portion expands. The resulting tension on the suspension lines going through the guides in the reefing device acts to push the reefing device downwardly and away from the canopy.

The reefing device of the invention slows or retards the opening of the canopy to prevent or alleviate the shock associated with normal opening of a parachute, yet the reefing device does not interfere with the use or function of the parachute.

The reefing device includes a central opening or vent so as to allow air to pass through the device to permit initial partial filling of the canopy with air. If the vent area is too small the canopy will not fill with air. On the other hand, if the vent is too large the reefing device does not slow the filling of the canopy to the desired degree.

The size or diameter of the reefing membrane may vary. For a round parachute having a constructed diameter of sixteen feet it is preferable for the outer diameter of the membrane to be about 3 feet, and the diameter of the center vent to be about 18-20 inches. For a round parachute having a constructed diameter of 40 feet it is preferable for the outer diameter of the membrane to be about 8 feet, and the diameter of the center vent to be about 5 feet.

The round or circular shape of the membrane is very desirable, and providing a separate guide member for each suspension line of the parachute is also important. This combination of features forces the canopy periphery to assume a desirable round or circular shape upon being deployed. This is extremely desirable since it allows the canopy to slowly begin filling wit air. It also assures that the suspension lines remain separated and that the forces are evenly distributed on the suspension lines.

Another advantage of the reefing device of the invention is that it can be provided in any desired diameter, and with any desired diameter for the center vent, so as to provide the exact degree of reefing desired for a particular parachute. Thus, the reefing device can be designed such that the parachute opens very slowly or more rapidly, as may be desired.

The outer diameter of the membrane may be less than or equal to the outer diameter of the canopy, but it should not be less than 0.05 times the canopy diameter. Generally speaking, the outer diameter of the membrane is in the range of about 10% to 40% of the constructed diameter of the canopy (and preferably is about 15-25% of the constructed diameter). The diameter of the center vent must be less than the canopy outer diameter but not less than 0.2 of the canopy vent diameter.

Other variants are possible without departing from the scope of the present invention. For example, the number and type of reinforcing strips used may vary, as described.

What is claimed is:

1. A reefing system for slowing the opening of the canopy of a parachute having a plurality of suspension lines connected to the periphery of said canopy, said system comprising:
    (a) a flexible, annular membrane having a centrally located vent opening;
    (b) a plurality of guides symmetrically spaced around the perimeter of said membrane, wherein the number of said guides is at least equal to the number of said suspension lines; wherein said guides comprise apertures in said membrane near the periphery thereof;
    wherein each said guide is adapted to permit a said suspension line to pass therethrough, and wherein said system is adapted to retard opening of said canopy when said parachute is deployed.

2. A reefing system in accordance with claim 1, wherein said membrane comprises rip-stop nylon.

3. A reefing system in accordance with claim 1, further comprising reinforcement strips extending across said vent opening.

4. A reefing device in accordance with claim 3, wherein there are three said reinforcement strips which extend across said vent opening and are symmetrically spaced, wherein said strips are secured to each other at their mid-points.

5. A reefing system in accordance with claim 1, wherein said membrane has an outer diameter in the range of about 3 to 8 feet, and wherein said vent opening has a diameter of about 1.5 to 5 feet.

6. In a parachute of the type including a round canopy and a plurality of suspension lines secured to the periphery of said canopy, wherein the improvement comprises a reefing device comprising:
(a) a flexible, annular membrane having a centrally located vent opening;
(b) a plurality of guides symmetrically spaced around the perimeter of said membrane, wherein the number of said guides is at least equal to the number of said suspension lines; wherein said guides comprise apertures in said membrane near the periphery thereof;
wherein each said suspension line passes through a separate one of said guides; and wherein said reefing device is adapted to retard opening of said canopy when said parachute is deployed.

7. The improvement in accordance with claim 6, wherein said membrane comprises rip-stop nylon.

8. The improvement in accordance with claim 6, wherein said membrane has an outer diameter in the range of about 3 to 8 feet, and wherein said vent opening has a diameter of about 1.5 to 5 feet.

9. The improvement in accordance with claim 6, further comprising reinforcement strips extending across said vent opening.

10. The improvement in accordance with claim 9, wherein there are three said reinforcement strips which extend across said vent opening and are symmetrically spaced, wherein said strips are secured to each other at their mid-points.

11. A reefing system for slowing the opening of the canopy of a parachute having a plurality of suspension lines connected to the periphery of said canopy, said system comprising:

(a) a flexible, annular membrane having a centrally located vent opening;
(b) a plurality of guides symmetrically spaced around the perimeter of said membrane, wherein the number of said guides is at least equal to the number of said suspension lines; wherein said guides comprise ring members secured to the outer edge of said membrane; wherein each said guide is adapted to permit a said suspension line to pass therethrough, and wherein said system is adapted to retard opening of said canopy when said parachute is deployed.

12. A reefing system in accordance with claim 11, further comprising reinforcement strips extending across said vent opening.

13. In a parachute of the type including a round canopy and a plurality of suspension lines secured to the periphery of said canopy, wherein the improvement comprises a reefing device comprising:
(a) a flexible, annular membrane having a centrally located vent opening;
(b) a plurality of guides symmetrically spaced around the perimeter of said membrane, wherein the number of said guides is at least equal to the number of said suspension lines; wherein said guides comprise ring members secured to the outer edge of said membrane;
wherein each said suspension line passes through a separate one of said guides; and wherein said reefing device is adapted to retard opening of said canopy when said parachute is deployed.

14. The improvement in accordance with claim 13, further comprising reinforcement strips extending across said vent opening.

* * * * *